US010586221B1

(12) United States Patent
Blumenfeld et al.

(10) Patent No.: US 10,586,221 B1
(45) Date of Patent: Mar. 10, 2020

(54) REGULATING ACCESS TO CONTENT USING A MULTITIERED RULE BASE

(75) Inventors: Steven M. Blumenfeld, Lafayette, CA (US); William J. Raduchel, Great Falls, VA (US)

(73) Assignee: Time Warner Inc., New York, NY (US)

( * ) Notice: Subject to any disclaimer, the term of this patent is extended or adjusted under 35 U.S.C. 154(b) by 392 days.

(21) Appl. No.: 12/685,235

(22) Filed: Jan. 11, 2010

Related U.S. Application Data

(63) Continuation of application No. 10/691,970, filed on Oct. 24, 2003, now Pat. No. 7,647,277, which is a continuation-in-part of application No. 10/429,963, filed on May 6, 2003, now Pat. No. 7,373,658, and a continuation-in-part of application No. 10/412,682, filed on Apr. 14, 2003, now Pat. No. 7,315,946, which is a continuation of application No. 10/334,144, filed on Dec. 31, 2002, now abandoned.

(60) Provisional application No. 60/421,051, filed on Oct. 25, 2002.

(51) Int. Cl.
*G06Q 20/12* (2012.01)

(52) U.S. Cl.
CPC ................................ *G06Q 20/1235* (2013.01)

(58) Field of Classification Search
None
See application file for complete search history.

(56) References Cited

U.S. PATENT DOCUMENTS

| | | | |
|---|---|---|---|
| 3,610,721 A | | 10/1971 | Abramson |
| 4,108,367 A | | 8/1978 | Hannan |
| 4,149,269 A | | 4/1979 | Abe et al. |
| 4,528,588 A | | 7/1985 | Lofberg |
| 4,824,191 A | | 4/1989 | Kato |
| 5,250,787 A | * | 10/1993 | Arii ...................... G11B 7/0037 235/375 |
| 5,486,933 A | | 1/1996 | Shindo |
| 5,587,984 A | | 12/1996 | Owa |
| 5,671,412 A | * | 9/1997 | Christiano ............. G06Q 30/04 |
| 5,689,561 A | | 11/1997 | Pace |
| 5,719,691 A | | 2/1998 | Curtis |
| 5,813,009 A | | 9/1998 | Johnson |
| 5,892,900 A | * | 4/1999 | Ginter .................... G06F 21/10 726/26 |
| 5,898,830 A | | 4/1999 | Wesinger et al. |
| 5,982,900 A | | 4/1999 | Ginter et al. |
| 5,989,923 A | | 11/1999 | Lowe |
| 6,052,788 A | | 4/2000 | Wesinger et al. |
| 6,236,971 B1 | | 5/2001 | Stefik et al. |

(Continued)

OTHER PUBLICATIONS

Office Action dated Sep. 21, 2009, in related U.S. Appl. No. 11/966,428, 10 pages.

(Continued)

*Primary Examiner* — Zeshan Qayyum
(74) *Attorney, Agent, or Firm* — Fish & Richardson P.C.

(57) ABSTRACT

Access to a content selection may be regulated by accessing a medium associated with the content selection, identifying a profile associated with the medium, using the profile to analyze a content request with a multitiered rule base that includes two or more of a medium rule base, a media player rule base, and a host rule base, and enabling access to the content selection in accordance with one or more results of the analysis.

20 Claims, 13 Drawing Sheets

(56) References Cited

U.S. PATENT DOCUMENTS

| | | | |
|---|---|---|---|
| 6,301,660 | B1 | 10/2001 | Benson |
| 6,314,409 | B2 | 11/2001 | Schneck et al. |
| 6,314,518 | B1 | 11/2001 | Linnartz |
| 6,330,549 | B1 | 12/2001 | Merkle |
| 6,351,813 | B1 | 2/2002 | Mooney et al. |
| 6,385,729 | B1 | 5/2002 | DiGiorgio et al. |
| 6,434,535 | B1 | 8/2002 | Kupka et al. |
| 6,503,147 | B1 | 1/2003 | Stockdale et al. |
| 6,513,121 | B1 | 1/2003 | Serkowski |
| 6,519,700 | B1 | 2/2003 | Ram et al. |
| 6,523,119 | B2 | 2/2003 | Pavlin et al. |
| 6,542,358 | B1 | 4/2003 | Kunz et al. |
| 6,547,146 | B1 | 4/2003 | Meksavan et al. |
| 6,550,011 | B1 | 4/2003 | Simms, III |
| 6,557,104 | B2 | 4/2003 | Vu et al. |
| 6,567,794 | B1 | 5/2003 | Cordery et al. |
| 6,577,561 | B2 | 6/2003 | Pirot et al. |
| 6,606,707 | B1 * | 8/2003 | Hirota .................. G06F 21/10 713/172 |
| 6,651,169 | B1 | 11/2003 | Benson et al. |
| 6,651,175 | B1 | 11/2003 | Slama |
| 6,658,000 | B1 | 12/2003 | Raciborski et al. |
| 6,658,585 | B1 | 12/2003 | Levi |
| 6,658,586 | B1 | 12/2003 | Levi |
| 6,662,228 | B1 | 12/2003 | Limsico |
| 6,665,799 | B1 | 12/2003 | Slama |
| 6,671,808 | B1 | 12/2003 | Abbott et al. |
| 6,674,259 | B1 | 1/2004 | Norman et al. |
| 6,678,665 | B1 | 1/2004 | Benson et al. |
| 6,708,157 | B2 | 3/2004 | Stefik et al. |
| 6,714,921 | B2 | 3/2004 | Stefik et al. |
| 6,751,738 | B2 | 6/2004 | Wesinger et al. |
| 6,804,783 | B1 | 10/2004 | Wesinger et al. |
| 7,028,336 | B2 | 4/2006 | Wesinger et al. |
| 7,031,301 | B1 | 4/2006 | Oz et al. |
| 7,191,153 | B1 * | 3/2007 | Braitberg ............. G06Q 20/12 705/50 |
| 7,249,378 | B2 | 7/2007 | Wesinger et al. |
| 7,315,946 | B1 | 1/2008 | Blumenfeld et al. |
| 7,373,658 | B1 | 5/2008 | Blumenfeld et al. |
| 7,647,277 | B1 | 1/2010 | Blumenfeld et al. |
| 8,011,007 | B2 | 8/2011 | Blumenfeld et al. |
| 8,584,253 | B2 | 11/2013 | Blumenfeld et al. |
| 2001/0025269 | A1 * | 9/2001 | Otsuka ............................ 705/52 |
| 2002/0012445 | A1 | 1/2002 | Perry |
| 2002/0043557 | A1 | 4/2002 | Mizoguchi et al. |
| 2002/0080997 | A1 | 6/2002 | Rhoads |
| 2002/0090109 | A1 | 7/2002 | Wendt |
| 2002/0112034 | A1 | 8/2002 | Feik |
| 2002/0114027 | A1 | 8/2002 | Horimai |
| 2003/0012382 | A1 | 1/2003 | Ferchichi et al. |
| 2003/0028814 | A1 | 2/2003 | Carta et al. |
| 2003/0034400 | A1 | 2/2003 | Han |
| 2003/0217006 | A1 | 11/2003 | Roever et al. |
| 2004/0230797 | A1 | 11/2004 | Ofek et al. |
| 2004/0252832 | A1 | 12/2004 | Domjan et al. |
| 2005/0283839 | A1 | 12/2005 | Cowburn |
| 2006/0030985 | A1 | 2/2006 | Lawida et al. |
| 2007/0067246 | A1 | 3/2007 | Wang |
| 2008/0163351 | A1 | 7/2008 | Blumenfeld et al. |
| 2014/0137207 | A1 | 5/2014 | Blumenfeld et al. |

OTHER PUBLICATIONS

Office Action dated Apr. 28, 2010, in related U.S. Appl. No. 11/966,428, 7 pages.

"Out of Band Methodology," Jun. 28, 2004, StikeForce Technologies Inc., p. 1-5.

"C.O.B.A.S. Centralized Out-of-Band Authentication System," Sep. 8-9, 2003, QT Worldtel Inc., Southeast Europe Cybersecurity Conference, p. 1-14.

Office Action issued in related U.S. Appl. No. 11/966,428 dated Sep. 30, 2010, 7 pages.

Office Action dated May 23, 2012 in related U.S. Appl. No. 13/220,418, 19 pages.

Office Action dated Sep. 30, 2010 in related U.S. Appl. No. 11/966,428, 7 pages.

Notice of Allowance dated Jan. 5, 2011 in related U.S. Appl. No. 11/966,428, 6 pages.

Notice of Allowance dated Apr. 21, 2011 in related U.S. Appl. No. 11/966,428, 9 pages.

Office Action dated Feb. 12, 2015 in related U.S. Appl. No. 14/075,695, 13 pages.

Office Action dated Feb. 16, 2016 in related U.S. Appl. No. 14/987,340, 19 pages.

Final Office Action dated Aug. 23, 2016 in related U.S. Appl. No. 14/987,340, 18 pages.

Office Action dated Apr. 3, 2017, in related U.S. Appl. No. 14/987,340, 31 pages.

Notice of Allowance dated Oct. 4, 2017 in related U.S. Appl. No. 14/987,340, 10 pages.

Office Action dated Feb. 16, 2016 in related U.S. Appl. No. 14/987,340, 23 pages.

Office Action dated Aug. 23, 2016 in related U.S. Appl. No. 14/987,340, 18 pages.

\* cited by examiner

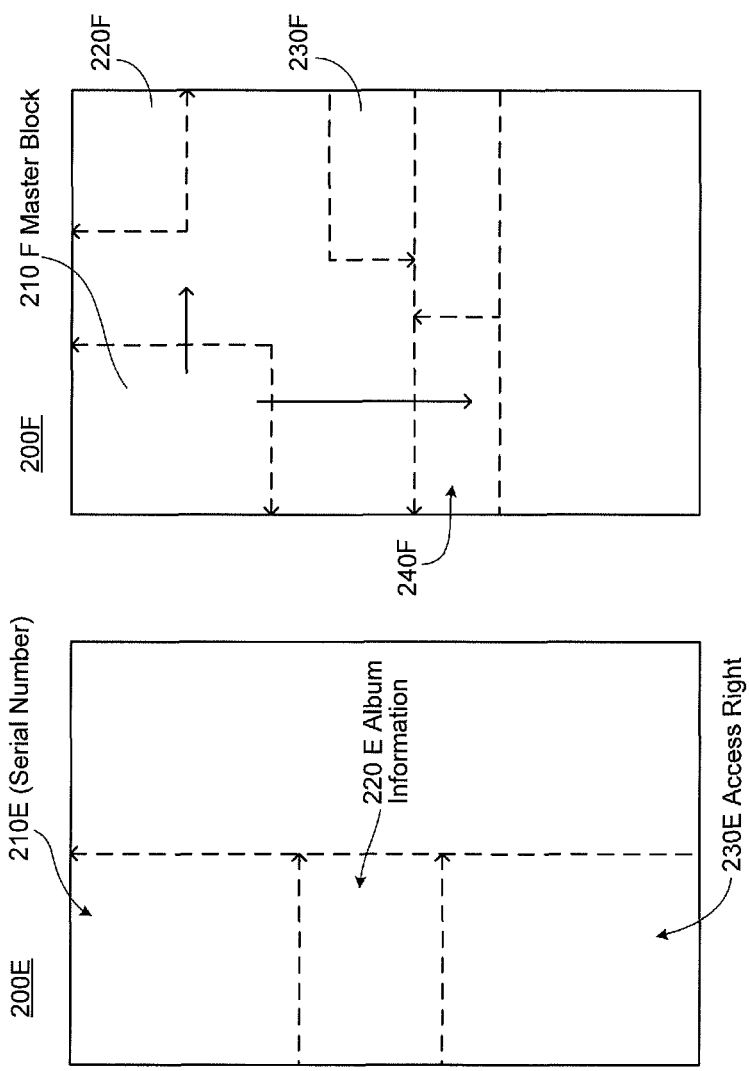

REGULATING ACCESS TO CONTENT USING A MULTITIERED RULE BASE

CROSS-REFERENCE TO RELATED APPLICATIONS

This application is a continuation of U.S. application Ser. No. 10/691,970, filed Oct. 24, 2003, and titled "Regulating Access to Content using a Multitiered Rule Base; which is a continuation-in-part of U.S. Provisional Application No. 60/421,051, filed Oct. 25, 2002, and titled "Out-of-band Tokens for Digital Rights Management"; U.S. application Ser. No. 10/334,144, filed Dec. 31, 2002, and titled "Out-of-band Tokens for Rights Access," now abandoned; U.S. application Ser. No. 10/412,682, filed Apr. 14, 2003 and titled "Out-of-Band Tokens for Rights Access," which issued as U.S. Pat. No. 7,315,946 on Jan. 1, 2008; and U.S. application Ser. No. 10/429,963, filed May 6, 2003 and titled "Electronic Loose-Leaf," which issued as U.S. Pat. No. 7,373,658 on May 13, 2008. These applications are incorporated by reference.

TECHNICAL FIELD

This document relates to content management systems.

BACKGROUND

The emergence of new technologies has created more channels for dissemination of content to which access is not necessarily authorized. Moreover, with digital copying tools and Internet-based distribution programs, content that has been accessed without authorization may be digitally copied many times without distortion.

SUMMARY

In one general sense, access to content may be regulated by accessing a medium associated with a content selection, identifying a profile associated with the medium, using the profile to analyze a content request with a multitiered rule base that includes two or more of a medium rule base, a media player rule base, and a host rule base, and enabling access to the content selection in accordance with the analysis.

Implementations may include one or more of the following features. For example, identifying the profile may include identifying a reference such as, a unique serial number.

A user accessing the content selection may be identified. Using the profile to analyze the content request may include determining an access right for the user for content identified by the profile. The content request may be reported to a reporting agent. Reporting the content request may include aggregating multiple content requests to the media player and reporting the multiple content requests to a host.

Using the profile to analyze the content request may include identifying priorities for rule bases within the multitiered rule base and polling a higher priority rule base to analyze the content request before polling a lower priority rule base. Using the profile also may include automatically discovering additional access rights by polling the multitiered rule base if a user attempts to engage in a content request for an operation not previously allowed in accordance with the access right.

The user may be enabled to engage in the content request by charging the content request against a user account. Charging against the user account may include adjusting a license pool that enables the user to engage in one or more licensing operations. Adjusting the license pool may include adjusting an escrow account for previously purchased access rights that do not specifically identify the content selection, or using an out-of-band token to identify the account, and charging the content request against the user account in response to using the out-of-band token.

Using the profile to analyze the content request may include using the host rule base to analyze content requests, using the media player rule base if the host rule base is unavailable, and using the medium rule base if the media player rule base is unavailable. Using the profile to analyze the content request includes determining an access right without challenging a user. Reading the medium may include reading an out-of-band token related to the medium. Using the multitiered rule base may include using the multitiered rule base in an operation that is transparent to the user. Using the profile to analyze the content request may include enabling a user to copy content only when the host rule base is used to analyze the content request, or enabling a user to copy content when a content-access system rule base is used to analyze a content request and the media player storing the media player rule base has exchanged licensing information with a host.

Other features will be apparent from the following description, including the drawings, and the claims.

DESCRIPTION OF DRAWINGS

FIG. 2E illustrates another exemplary out-of-band token.

FIG. 2F illustrates how a master location may dynamically generate an out-of-band token.

DETAILED DESCRIPTION

Figure 1:
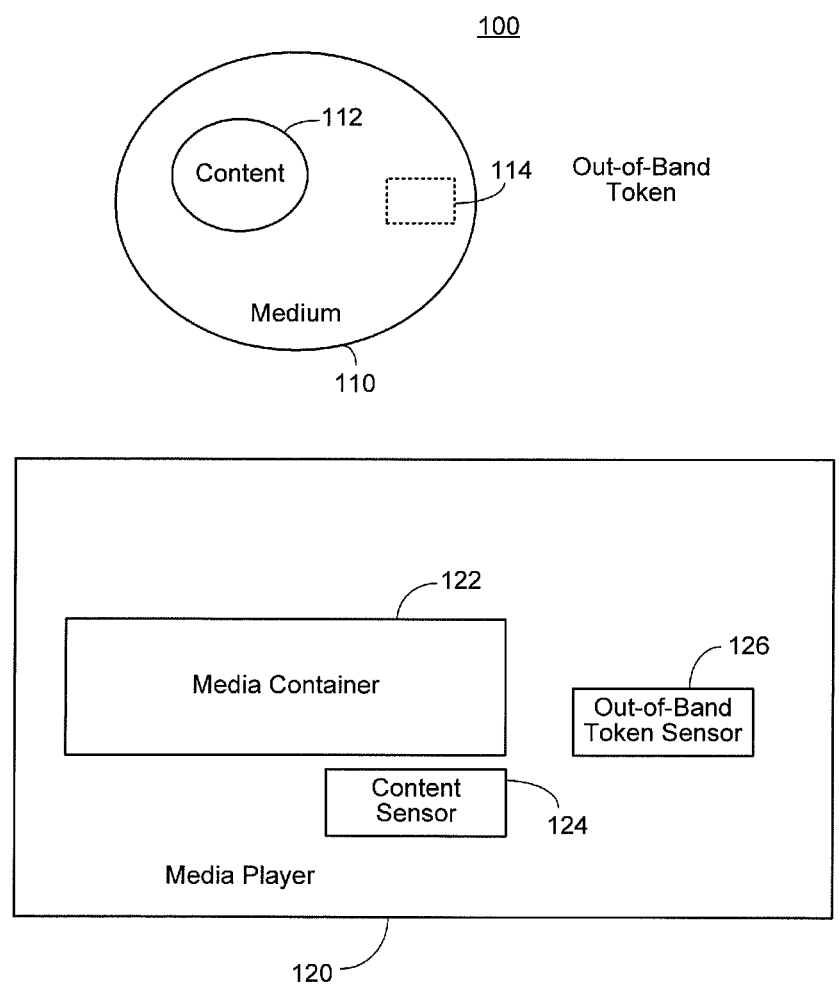
FIG. 1 is a block diagram of a media player.

For illustrative purposes, FIGS. 1-11 describe a media player for regulating access to content by analyzing a content request with a multitiered rule base. The multitiered rule base may include using a medium rule base (e.g., a set of access rules stored on the optical disk), a media player rule base (e.g., a set of access rules stored on a jukebox or optical disk player), and a host rule base (e.g., a set of access rules stored on a network host). Generally, a media player accesses content, and identifies a profile for the content. The profile may include an album title, a serial number for an optical disk, or a rule base describing how content may be accessed. Regardless of the underlying profile, the media player uses the profile to analyze a content request. The content request may include a request to play or copy a content selection. Analyzing the content request includes using a multitiered rule base that includes two or more of a medium rule base, a media player rule base, and a host rule base. Using the multitiered rule base does not require the media player to use all tiers in the multitiered rule base. Rather, using the multitiered rule base may include a hierarchical rule base that the media player uses to determine the access rights. Thus, when the media player is able to analyze the transaction using one of the tiers, the other tiers need not be referenced to determine the access rights.

With the results of the multitiered analysis, the media player selectively enables access to the content selection in a manner consistent with the analysis and the determined results. Thus, a user may be allowed to read but not copy content.

The following simplified example is used to illustrate the use of a media player packaged as an optical disk player that uses a multitiered rule base in determining access rights for an optical disk. In this example, the user inserts an optical disk into an optical disk player in order to "play" a musical selection on the optical disk. The optical disk player then reads optical disk information, either by reading in-band information, or by reading an out-of-band token (e.g., appearing in the case for the optical disk). The optical disk information is read to generate a profile for the content being accessed.

The optical disk player then analyzes the content request using a multitiered profile. Initially, the optical disk player uses a communications interface to poll a host and determine if the optical disk player is allowed to play the musical selection. For example, in one implementation, the optical disk player uses the host rule base to interface with a centrally managed license and reporting system. For a number of reasons, the optical disk player may be unable to access the host rule base. This may include a failing connection between the host and the optical disk player, a dropped call, or a network failure. In another example, the optical disk player may avoid costs associated with the communications. The costs may include wireless airtime costs for using a wireless network interface, or limited bandwidth/connections to a host. In response, the optical disk player may aggregate multiple content requests and periodically poll the host with requests for the aggregated content requests.

In any event, the optical disk player uses a media player rule base associated with the optical disk player to analyze the content request. In one example, the optical disk player may manage multiple user accounts. Each user account may be associated with an allowed range of operations. Thus, a first user may be allowed to play any song on the optical disk, but may not be allowed to copy any of the songs. A second user may be allowed to play one or more promotional selections a limited number of times for a limited period. A third user may be allowed to make a limited number of copies.

The optical disk player also may use a medium rule base associated with the optical disk to analyze the content request. In one example, the optical disk player reads the permissions stored on an optical disk. The permissions may indicate a range of content requests in which the user may be allowed to engage. The optical disk player may use the medium rule base when the media player does not recognize the user operating the optical disk player. For example, the optical disk player may use the medium rule base as a default rule base when the optical disk player is unable to access the host rule base and the optical disk player does not recognize the user.

After using the multitiered rule base to analyze the content request, the optical disk player then may enable the user to access the musical selection in accordance with the results of the analysis. The user may be allowed to play the musical selection.

The media player may interface with an out-of-band token system or an electronic loose-leaf system in regulating access to a content selection. For example, an out-of-band token residing on the surface of an optical disk may be read in order to initially unlock access to the optical disk. Alternatively, an out-of band token may be used to identify a user or the content selection, or may form part of the multitiered rule base. Similarly, an electronic loose-leaf may be used to regulate access to content. In one example, the electronic loose-leaf is used to identify a profile associated with the medium. In another example, the electronic loose-leaf provides information (e.g., user or content information) used in analyzing a content request with a multitiered rule base.

FIG. 1 illustrates one implementation of a content access system 100 configured to administer access to content. The content access system 100 includes a medium 110 and a media player 120. The medium 110 includes content 112 (e.g., electronic or optical content) and an out-of-band token 114 associated with the content 112. The media player 120 includes a media container 122, a content sensor 124, and an out-of-band token sensor 126. The media player 120 may use the out-of-band token sensor 126 to read the out-of-band token 114, and may use the results of the reading to determine access rights to the content 112.

Generally, the medium 110 includes one or more devices configured to store content. The medium 110 may be embodied or included in a portable dedicated storage device, such as a memory/storage key or a floppy, compact, optical (e.g., CD ("compact disc"), DVD ("digital video disk"), HD-DVD ("high definition digital video disk")), digital, versatile, or MP3 disk. Alternatively, the medium 110 may be included or integrated in another system, which may or may not be portable or remote. For example, the medium 110 may include a hard drive of a media player 120, which may be used as an access-regulated jukebox to enable multiple selections of content depending on the configuration of the media player 120 and the access rights for a user accessing the media player 120. Alternatively, the medium 110 may reside on a remote system that is accessible to a media player 120 and that is operated by a third party, such as a record label.

Generally, the content resides in the channel for which the medium was designed. For example, in an optical disk medium, the content (e.g., a song) is stored as optical binary bits. These optical bits may be read by targeting a location in the optical disk with an optical transceiver and determining whether each of a series of optical bits is logically set to a '1' or '0'. Alternatively, if the medium 110 includes a compact flash card or a hard disk drive, the content 112 may reside in the memory in the compact flash card or on the magnetic platters of the hard disk drive.

The out-of-band token 114 is an authentication system configured to establish access controls or permissions for the content. The out-of-band token 114 and the content 112 reside in different frequencies, channels, media, physical structures, or formats such that the out-of-band token 114 is not read by the sensor used to read the content 112. For example, when using different frequencies to achieve independence among content 112 and token 114, the content 112 may be read at a first wavelength and the out-of-band token 114 may be read at a second wavelength.

The out-of-band token 114 may be configured so that a consumer may be unable to recreate the out-of-band token 114. For example, a consumer may be able to distribute the content, for example, using file sharing protocols and optical disk writing technologies. However, a mint with equipment that is not accessible to consumers may be necessary to write the out-of-band token 114. The mint may include an industrial printer or a hologram writer. The mint also may be configured to associate a particular instance of the medium 110 or the content 112 with the out-of-band token 114 being fabricated. For example, the mint may associate a serial number for the medium 110 or the content 112 with the out-of-band token 114. Thus, an out-of-band token 114 associated with a first medium 110/piece of content 112 may not be used with a second medium 110/piece of content 112.

The out-of-band token 114 need not be distributed with the medium 110. For example, a content provider may electronically distribute selections of content to one or more storage locations. At a later time, a consumer may use the out-of-band token 114 to unlock the content, which has been electronically distributed and is already residing in, for example, an electronic jukebox.

The out-of-band token 114 may describe the instances of content 112 that may be accessed. For example, the out-of-band token may include a serial number printed on the surface of a disk. This serial number also may be stored in the content on the optical disk.

The out-of-band token 114 may be a passive device that is not required to be electronically interrogated. In contrast, an active out-of-band token 114 may include an electronic or magnetic interface that is interrogated electronically. For example, the out-of-band token 114 may include a disk cover that is read by an optical "eye" configured to read disk covers. One example of an active out-of-band token 114 is an electronic key that is inserted into a key reader. The key reader may electronically probe key logic and/or memory to make an access control determination.

The media player 120 includes a medium container 122, a content sensor 124, and an out-of-band token sensor 126. Generally, as described in greater detail with respect to FIG. 3, the media player 120 is configured to (1) receive and secure medium 110 using medium container 122, (2) read the out-of-band token 114 using the out-of-band token sensor 126, (3) determine access rights based on the token 114, and (4) read the desired content from the medium 110 using the content sensor 124 (e.g., an optical or magnetic head) if sufficient rights exist.

The media player 120 also may include and run one or more software applications. For example, the media player 120 may run a software application configured to administer a digital rights management program. The digital rights management program may be used to determine an access right for the content. Other software applications on the media player 120 may include a software application configured to display content information (e.g., a cover, lyrics, artist information, and/or purchasing information for the content). Although the media player 120 may relate to other media players, such as a CD player and/or a DVD player, the media player 120 also may relate to more flexible electronic equipment, such as a personal computer. For example, a computer may be configured as a stereo system that runs a general-purpose operating system with one or more media applications performed by a general operating system and a general-purpose processor. Additionally, the computer may be configured to respond to controls such as those typically found on a stereo system (e.g., a volume control dial).

The media container 122 is a device configured to receive and support a medium 110. For example, the media container 122 may include a tray configured to hold an optical disk and retrieve the optical disk into the media player 120 to play the content on the optical disk. Alternatively, the medium container 122 may include a slot, a pressed-on lid used to insert an optical disk, a container configured to receive various forms of electronic storage (e.g., compact flash, non-volatile memory), or some other mechanism capable of receiving and supporting a medium 110.

The content sensor 124 includes a detector configured to read content 112 residing in a medium 110 that has been placed in or that is supported by the media container 122. The content sensor 122 may include an optical transceiver configured to read content written to or otherwise stored by an optical medium 110, such as an optical disk. Another example of the content sensor 124 may include a memory reader configured to read electronic and/or magnetic memories.

The content sensor 124 may be integrated with the media container 122. For example, the content sensor 124 may be configured to read an optical disk that has been placed in a tray configured to secure the optical disk. The tray may retrieve the optical disk, rotate the optical disk, and control the location of the content sensor to read an appropriate portion of the content, such as, for example, a particular track.

The out-of-band token sensor 126 includes a device configured to read an out-of-band token 114 associated with content 112. The token 114 then may be used to determine an access right for the content 112. Using an out-of-band token sensor 126, it is possible to detect or otherwise identify, infer or resolve access rights based on information that does not actually reside within the content 112 in the medium 110 itself. That is, to determine the access rights appropriate for the content 112 or the medium 110 itself, out-of-band sensor 126 may be used to access another source of information that resides in the medium 110 or a to channel that is distinct from the medium 110 or the channel of information used to store the content 112.

Furthermore, the out-of-band token sensor 126 may be configured to read a token 114 that is physically located proximate to or even sharing the same physical structure as the content 112. For example, the out-of-band token sensor 126 may read an out-of-band token 114 residing as an image printed the surface of an optical disk. Thus, to access the content 112, a first optical detection device (e.g., content sensor 124) may be used to play a CD, while a different sensor (e.g., out-of-band token sensor 126) is used to access out-of-band information residing on the label of the CD.

The out-of-band token sensor 126 may include a device distinct from the content sensor 124, or the out-of-band token sensor 126 may be co-located with the content sensor 124. For example, the out-of-band token sensor 126 may be configured to read the label affixed to the surface of a medium 110 that is inserted in the media container 122. By way of contrast, the out-of-band token sensor 126 in another example may not be co-located with the content sensor 124. For instance, the out-of-band token sensor 126 may read a label on the optical disk that is swiped under an external out-of-band token sensor 126 before the optical disk is placed in a tray acting as the media container 122. In another configuration, the out-of-band token sensor 126 may be configured to read out-of-band tokens 114 that are not co-located with the medium 110. For example, the medium 110 may be inserted in the media container 122, and the cover of a case for the medium 110 may be swiped or placed before an out-of-band token sensor 126 that is configured to read one or more portions of the case cover to determine the access rights for the content.

The out-of-band token 114 may be stored on the medium 110 (e.g., on the label on the surface of the optical disk) as a hologram that is written onto the optical disk but that resides in a different band than the content itself. Furthermore, the hologram itself need not be stored as digital information. For example, the hologram may comprise an analog image that may be scanned by the out-of-band token sensor 126.

Figure 2A:
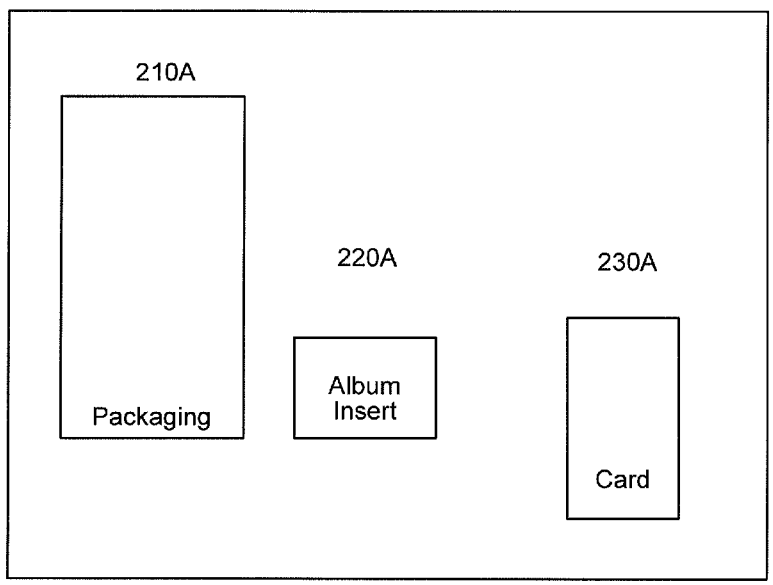
FIG. 2A is a block diagram of devices that may be included in a distribution of a medium that may be used as an out-of-band token.

Referring to FIG. 2A, one or more items may be distributed as packaging 200A for medium 110 and used as an out-of-band token 114. When configured to act as an out-of-band token 114, an item may be read by the out-of-band token sensor 126 described with respect to FIG. 1. Generally, the systems in the packaging 200A may be distributed with the medium 110.

Specifically, the medium 110 described by FIG. 1 may be distributed with packaging 210A, an insert 220A, and/or a card 230A. For example, DVD disk packaging 200A may include a paper insert 220A that is descriptive of the DVD tracks, the credits and the lyrics. The insert 220A may include a guide to lyrics that is being distributed with a CD. Additionally, a card 230A with a high quality image may be distributed. The card 230A may be used to describe the content on the medium itself (e.g., track descriptions). The card may be inserted in a jacket of the medium and collected by an owner.

Typically, in addition to the items shown by FIG. 2A, the packaging 210A includes one or more devices or components configured to protect the medium from being damaged. The packaging also may include one or more theft deterrent devices and/or logistics management components configured to manage the medium itself. For example, the packaging may include a bar code and/or a RF ("Radio Frequency") identification sensor that may be used in support of inventory and security functions. These items also may be used as out-of-band tokens.

The medium may include an optical disk with one or more pieces of content available for use. This content may be digitally secured (e.g., encrypted). Alternatively, the medium may include content that is not secure and instead relies on a media player 120 to administer a digital rights management scheme.

Figure 2B:
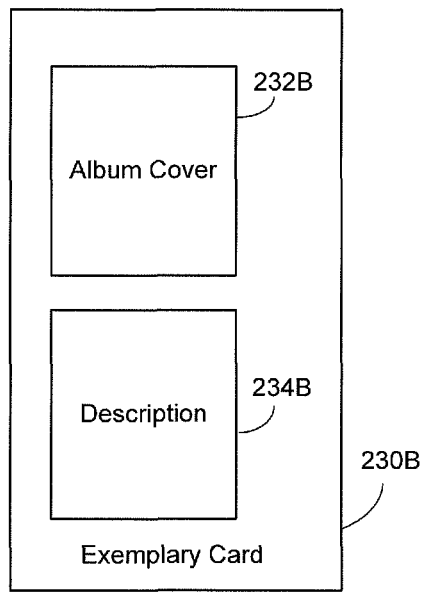
FIG. 2B is a block diagram of a card that may be used to signal access rights.

Referring to FIG. 2B, an exemplary card 230B may be configured to act as an out-of-band token. Generally, the card 230B relates to the card 230A described previously in the context of packaging 200A in FIG. 2A. However, card 230B includes a cover image 232B and a description 234B and may have an image used to determine access rights. Although information in the image may not be discernable to the naked eye of an observer, the out-of-band token sensor 126 may detect information residing in the image and use that information to determine the user access rights. For example, user access rights may be specified by a certain color or pattern appearing in a portion of the cover image 232B. Card 230B also illustrates how the access rights may be incorporated into a card 230B that may be useful to the user as a medium identifier.

Figure 2C:
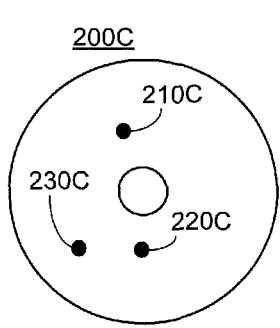
FIGS. 2C and 2D together illustrate a medium to show how information appearing on the surface of the medium may generate an out-of-band token when the medium shown in FIG. 2C is spun.
Figure 2D:
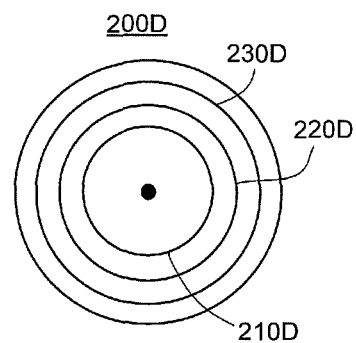

Referring to FIGS. 2C and 2D, an exemplary medium 200C illustrates how an out-of-band token may be generated from information appearing on the surface of a medium 110. The out-of-band token sensor 126 may be configured to read token information that is not generated until the medium 110 itself is processed. For example, a pattern of information may be written on the label on an optical disk. As the label is spun, a pattern may be generated on the surface of the optical disk, this pattern may be read to determine the access rights for the content. For example, the information may be encoded in areas 210C, 220C, and 230C of the medium 200C. As medium 200C is spun, an out-of-band token 200D may be generated and read from the surface of the medium 200C, as shown by the exemplary pattern of rings illustrated by FIG. 2D. When spun, the images 210C, 220C, and 230C generate rings 210D, 220D, and 230D, which may be used to determine the access rights.

Referring to FIG. 2E, an image 200E may be used as an out-of-band token 114 with encoded access rights. Image 200E includes a first portion configured to encode an identifier (e.g., a serial number 210E), a second different portion configured to describe a second identifier (e.g., medium information 220E), and a third portion configured to define the access rights 230E. As such, the serial number, medium information and access rights may be co-located or they may be located in different portions of the image.

Similarly, not all portions of the image must be used. In fact, only a portion of the image may be used to determine the access rights. Similarly, different portions of the image may be used for different instances of the medium 110. For example, the access rights for a first user may be found in the upper left-hand corner, whereas, for the same content on a second medium, the access rights may reside in the lower right-hand corner.

The location of the access rights in the out-of-band token does not necessarily need to be specified in the same portion in advance. For example, in FIG. 2F, image 200F illustrates how a master location located on an image indicates where the user access rights are located in that image. For example, in image 200F, master location 210F indicates that regions 220F, 230F, and 240F should be used to determine the access rights. The master location may be located in a different portion of the image. For example, in one image, the master location may be located in the lower left-hand corner whereas, in another image for the same content, the master location may be located in the upper right-hand corner. The access rights may be located in randomly-selected locations from within the image.

Although several out-of-band tokens are shown, the out-of-band tokens are not limited to the out-of-band tokens shown in FIGS. 2A-2F. For example, other out-of-band tokens may include, but are not limited to, a promotional item also configured to act as an out-of-band token.

Figure 3:
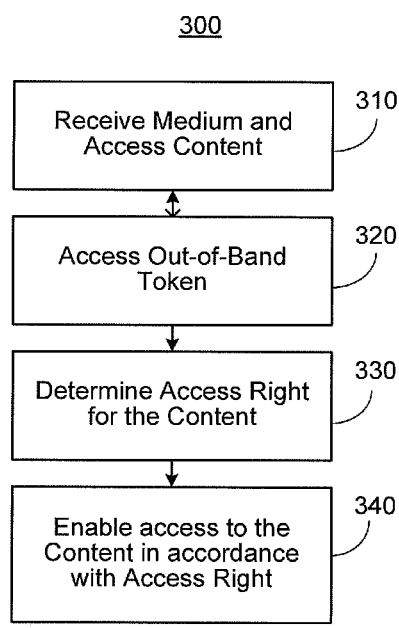
FIG. 3 is a flow chart of a procedure for accessing content leveraging an out-of-band token.

Referring to FIG. 3, a process 300 for administering access to content may be performed on systems that have been described previously (e.g., media player 120 using medium 110).

As shown, the medium is received and the content is accessed (310). Receiving the medium and accessing the content may include inserting a medium 110 into a media player 120. Accessing content also may include downloading content from a remote system. For example, a song may be downloaded from the Internet.

The out-of-band token is accessed (320). Generally, accessing the out-of-band token involves enabling the out-of-band token sensor 126 to read one or more out-of-band tokens 114. For example, after an optical disk has been inserted into a media player 120, the media player 120 may check the optical disk for an out-of-band token 114 residing on the surface of the optical disk and also may prompt the consumer to swipe an album cover underneath an additional out-of-band token sensor 126. Accessing an out-of-band token may involve more than one operation. For example, a consumer may be initially prompted for a first portion of the out-of-band token 114 and then subsequently prompted for another portion of the out-of-band token 114. More specifically, a first portion of the out-of-band token 114 may provide one indicia of access (e.g., the content serial number) and the second portion may be used to provide another indicia of access (e.g., the access rights).

With the content and the out-of-band token accessed, the access rights are determined (330). Generally, determining the access right for the content includes determining how a user may access the content. For example, permission to read, copy, and distribute the content may be indicated. Additionally, the access right may be set based on the device upon which the content is being accessed. For example, access rights may be limited to a particular media player, or a particular class of media players (e.g., a portable device).

Determining access rights for the content may include determining that no access rights have been identified. This may, in turn, trigger the application of one or more default rules based on user, device, and/or content criteria. For example, a default set of rules may be established and referenced for a particular user or class of users, a particular type of content selection, or a particular class of media player. One such default rule may determine that the access rights are limited to read-only or some other predetermined permission level.

Determining the access rights also may include retrieving an access right data store of multiple access rights. This access right data store may be accessed through a communications network, such as the configuration where the access right data store resides on a remote host 150. Determining the access rights also may include determining precisely how the content may be accessed. For example, determining the access rights may include specifying a number of times the content may be accessed.

With the access rights determined, access to the content is enabled in accordance with the access rights (340). For example, a controller on a media player 120 may be directed to enable only read rights to content and to preclude the user from copying the content.

As an optional operation (not shown), the out-of-band token may be registered. Registering the out-of-band token may enable the access rights to be modified. For example, until the out of the band token is registered, the access rights may be set to read-only permissions. However, upon determining that the user has registered the out-of-band token, the user may be given permission to make a predetermined number of copies of the content selection.

Although the operations of procedure 300 appear in a serial order, they may be performed in parallel and/or in a different order. For example, although accessing content 112 is shown as being performed after accessing the out-of-band token 114, those access operations may be performed in reverse order or in parallel. Thus, an out-of-band token on an optical disk may be read before or after the optical disk is inserted in the media player 120 and content of the disk is accessed. Similarly, the optical disk may be inserted and then a cover image may be read to access the out-of-band token, or the cover image may be read concurrently with insertion of the optical disk in the media player 120.

Figure 4:
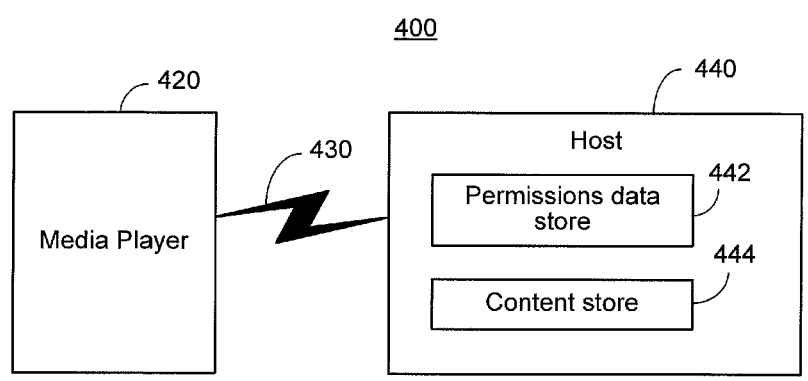
FIG. 4 is a block diagram of a communications system that includes a media player configured to access a host.

Referring to FIG. 4, an exemplary communications system 400 includes a media player 420 configured to access a remote data store 440 using a communications line 430. Generally, the media player 420 corresponds to the media player 120 described previously with respect to FIGS. 1-3. However, the media player 420 of FIG. 4 includes a network device configured to use the communications link 430 to determine access rights and/or retrieve content from the remote data store 440.

The communications link 430 typically includes a delivery network making a direct or indirect communication between the media player 420 and the host 440, irrespective of physical separation. Examples of a communications link 430 include the Internet, the World Wide Web, WANs ("Wide Area Networks"), LANs ("Local Area Networks), analog or digital wired and wireless telephone networks (e.g., PSTN ("Public Switched Telephone Network"), ISDN ("Integrated Services Digital Network"), and xDSL ("any type of Digital Subscriber Loop"), radio, television, cable, satellite, and/or any other delivery mechanism for carrying data. The communications link 430 may include communication pathways that enable communications through the two or more delivery networks. Each of the communication pathways may include, for example, a wired, wireless, cable or satellite communication pathway.

The host 440 is generally capable of executing instructions under the command of a host controller (not shown). The host 440 may include one or more hardware components and/or software components. An example of a host 440 is a general-purpose computer (e.g., a personal computer) capable of responding to and executing instructions in a defined manner. Other examples include a special-purpose computer, a workstation, a server, a device, a component, other physical or virtual equipment, or some combination thereof capable of responding to and executing instructions.

The controller is a software application loaded on the host 440 for commanding and directing communications with the media player 420. Other examples include a program, a piece of code, an instruction, a device, a computer, a computer system, or a combination thereof, for independently or collectively instructing the media player 420 or the host 440 to interact and operate as described. The media player 420 and the host 440 may be embodied permanently or temporarily in any type of machine, component, physical or virtual equipment, storage medium, or propagated signal capable of providing instructions to the media player 420 or the host 440.

The host includes a permissions data store 442 and a content store 444. The permissions data store 442 includes a program, an application or a device configured to provide security, digital rights management, and/or authentication services for the host 440. For example, the permissions data store 442 may include a listing of serial numbers and associated out-of-band tokens. Alternatively, the permissions data store 442 may include listings of user identification information and content that the user is allowed to access.

Typically, the content store 444 enables the media player 420 to access online content. Other services provided as part of the content store may include programs that aid in content selections, and e-commerce programs that enable access rights to be purchased or acquired. In one example, the content store 444 enables a consumer to find a content selection produced by the same artist. In another example, the content store enables the consumer to purchase the access rights.

Figure 5:
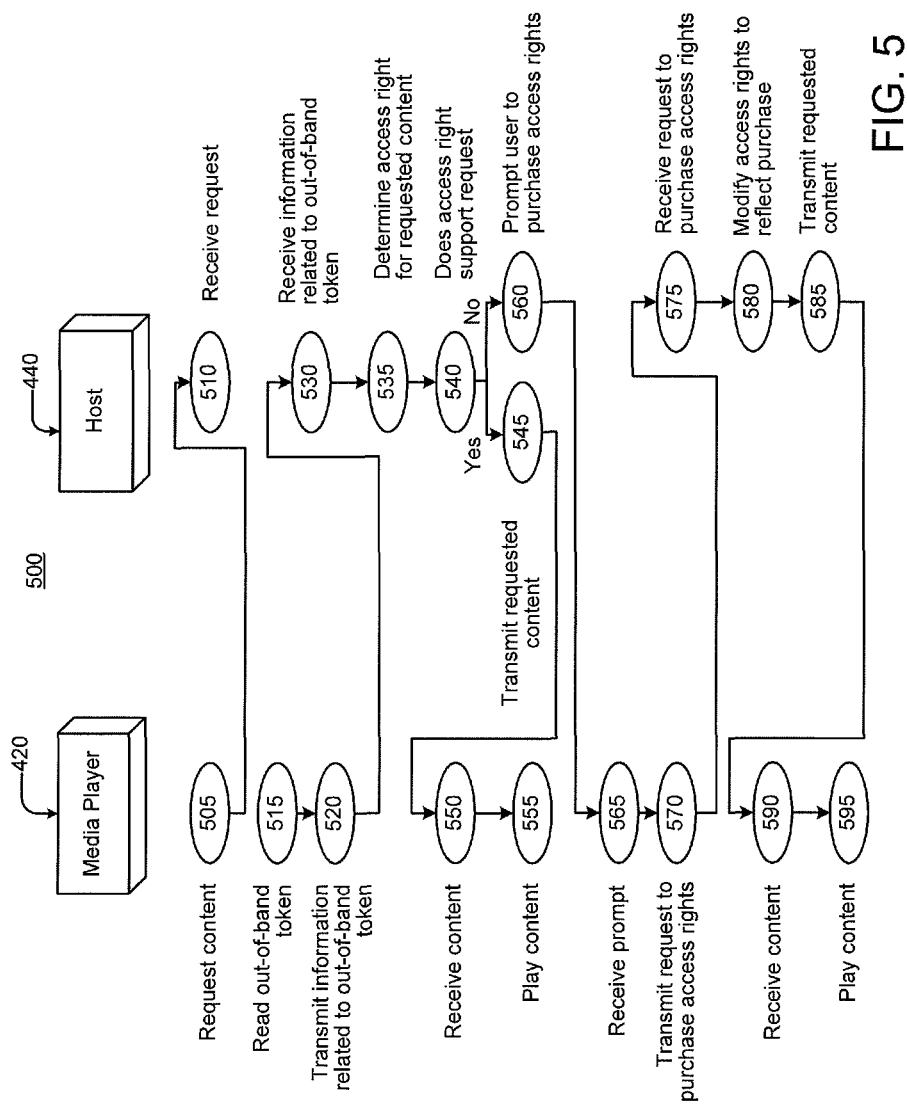
FIG. 5 is a flow chart of a process implemented by a media player configured to access a host.

FIG. 5 illustrates an exemplary flow chart 500 of a media player configured to access a host. Generally, the media player 420 and the host 440 correspond to the media players 120 and 420 described previously with respect to FIGS. 1-4 and the host 440 described with respect to FIG. 4.

Initially, the media player 420 requests content (505). The requested content may reside locally on the media player 420 (e.g., on an optical disk in an optical disk player), or the requested content may reside on a host. The host 440 receives the request (510). The media player 420 then reads the out-of-band token (515). Reading the out-of-band token may include using a card reader to read a card that has been purchased with access rights. The media player 420 transmits information related to the out-of-band token (520). Transmitting information related to the out-of-band token may include transmitting information that enables an access right to be determined. For example, the out-of-band token may include an image written on a card. The image may be read to determine a serial number. This serial number may be used as a reference to determine the access rights.

The host 440 receives the information related to the out-of-band token (530) and uses that information to determine the access rights (535). Determining the access rights may include referencing a user's permissions residing on a permissions store 442. For example, a registered user may be given a set of permissions for a set of content (e.g., the user may be allowed to copy a first piece of content). Alternatively, the access rights may be associated with a particular media player. For example, access to some content may be determined based on the identity of the media player being used to access the content.

The host 440 determines whether the access rights support the request for content (540). Determining whether the access rights support the request for content includes determining whether the permissions related to the out-of-band token allow for the content to be accessed in the requested manner. If the access rights supports the requested access, the host 440 transmits the requested content (545). The media player 420 then receives the content (550) and plays the content (555).

When the access rights do not support the request, the host 440 is configured to enable the user to acquire the access rights. For example, the host may prompt the user to purchase access rights (560). The user may receive the prompt (565). Receiving the prompt may include generating a display on the media player 420 that enables the user to acquire the content. For example, the user may have a payment link established so that the user may conveniently purchase access rights by reading an out-of-band token that identifies the user. In another example, the media player may prompt the user for payment information.

If the user elects to purchase access rights for the requested content, the media player 420 transmits the request to purchase access rights (570). The host 440 receives the request to purchase access rights (575). The host 440 then executes a transaction so that the access rights may be purchased (e.g., a credit card is charged) and modifies the access rights to reflect the purchase (580). Modifying the access rights to reflect the purchase may include adjusting a user record in a permissions data store 442 so that the user may access the requested content. Modifying the access rights also may include adjusting an access right that is locally maintained on the media player. For example, an optical disk player may have local permissions. Modifying the access rights may adjust the local permissions to enable access to the content without requiring the media player to subsequently access the host 440.

Where the content does not reside on the media player 420, the host 440 may transmit the content to the media player 420 (585). Transmitting the content to the media player 420 may include enabling the media player to download a particular file with the requested content. The media player receives the content (590) and plays the content (595).

Figure 6:
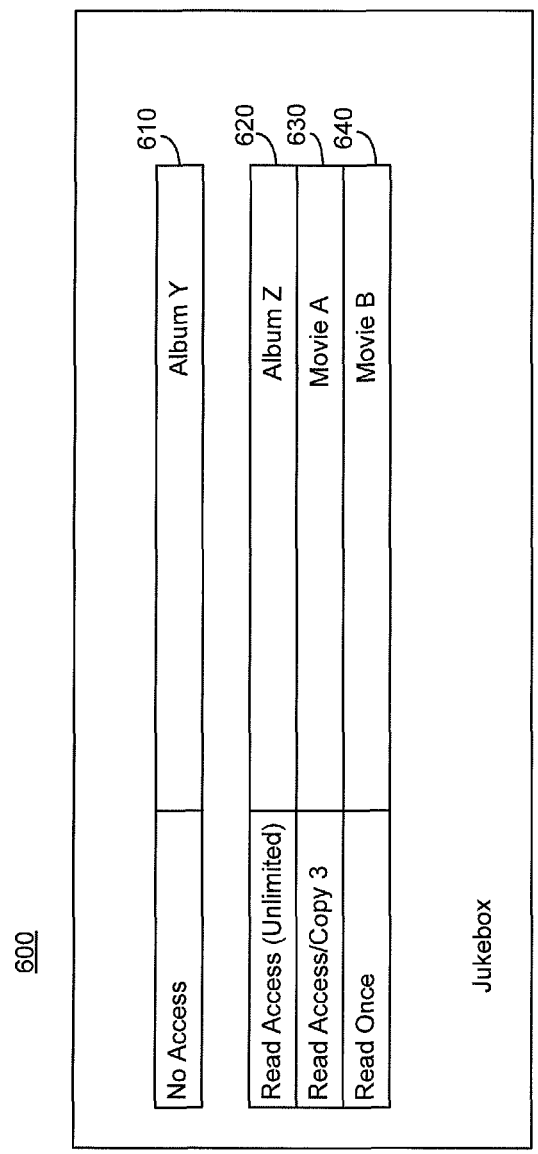
FIG. 6 is a block diagram of a jukebox configured to act as a media player.

FIG. 6 shows an exemplary list of access rights for a jukebox system 600. In jukebox 600, a content piece is selected along with access rights for the content. Generally, the jukebox 600 relates to the content access system 100 described in FIG. 1. However, FIG. 6 illustrates how the media player 120 may function as a jukebox. Typically, a jukebox 600 includes more than one content piece that may be selected, with multiple content pieces residing in a common location or media player.

In the example shown in FIG. 6, the jukebox 600 includes content that may be selectively accessible. Jukebox 600 includes records 610-640, with each record describing a piece of content and the related access right. In jukebox 600, record 610 describes a stored CD Y, for which the illustrated user has no access privileges, but for which the user may gain access privileges by purchasing use rights that are made available through use of an out-of-band token that enables access to the content. For example, a user may purchase a card 230A that unlocks CD Y for the holder of the card 230A. The jukebox 600 may include an out-of-band token sensor 126 configured to read the card 230A.

In jukebox 600, record 620 indicates that the user is given unlimited read access to CD Z. For example, the illustrated user may have purchased the CD and, by virtue of the purchase, may have unlimited listening rights to the CD. The access rights regulating unlimited read access to the CD may have been established by the user using out-of-band token 114 to unlock the unlimited access rights to CD Z.

In contrast to the unlimited access rights to CD Z, for Movie A, record 630 indicates that the user has read access rights and may make a limited number of copies of Movie A.

Finally, record 640 indicates that the user has read-once access rights for Movie B. This may be because, for example, Movie B is being distributed in a promotion and the user has received read once access rights in the course of participating in the promotion. For example, a marketing company may distribute promotional items in a magazine. The magazine promotion may include the card 230A, which may be read by the out-of-band token sensor 126 residing in jukebox 300. Upon accessing Movie B once, the user's access rights to Movie B are terminated.

The jukebox 600 may use a host-based system to track the number of copies or viewings. For example, a user may register the user's instance of the content on a host-based registry. Upon copying the content, a counter may be decremented to reflect that the user has consumed one right to copy or view. When the counter indicates that no more access rights exist, permission to perform the copying or viewing may be denied.

Figure 7:
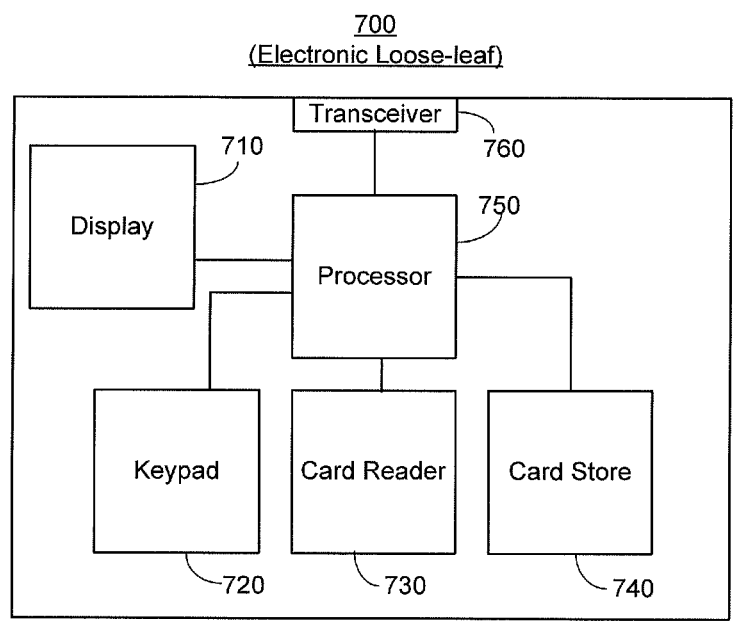
FIG. 7 is a block diagram of an electronic loose-leaf configured to interface with a media player.

Referring to FIG. 7, an electronic loose-leaf 700 is configured to read cards related to the content selection being accessed by a media player. The electronic loose-leaf 700 may access an out-of-band token residing in the card and interface with a media player to determine access rights and enable access to the content selection. In some implementations, the electronic loose-leaf 700 may include a book, folder, or organizer that stores optical disks not being used and also acts as a remote control to operate a media player. A user may insert a card associated with an optical disk into a card reader. The user then may insert the associated optical disk in the media player. If the card relates to the optical disk in the media player, the user may be granted access based on that relationship.

The electronic loose-leaf 700 includes a display 710, a keypad 720, a card reader 730, a card store 740, a processor 750, and a transceiver 760. The electronic loose-leaf 700 illustrates exemplary components that may be incorporated into the electronic loose-leaf 700. Other electronic loose-leafs may include different systems.

Generally, the display 710 includes a device configured to generate visual information related to the content selection being accessed. The display 710 may include a LCD ("Liquid Crystal Display") or other display device. The display 710 may include a reconfigurable or static display. For example, a reconfigurable display may generate customizable icons for the user. The customizable icons may be related to the user's preferences or to the content selection being accessed. In contrast, a static display includes icons that that are manufactured into the display. For example, an icon featuring a PLAY button may be written into a certain portion of the display using a right facing triangle.

The keypad 720 includes one or more buttons that enable a user to enter a selection to control a media player to access a content selection. Although a keypad has been described, other input devices that may be used may include, but are not limited to, a LCD display, a track ball, a joystick, a mouse, a toggle, a button, and/or another device configured to enable a user to input a selection.

The card reader 730 includes a sensor configured to read a card describing content that is accessed. For example, the card may include an out-of-band token that is used to determine access rights. The card reader 730 may include an image sensor configured to read an image residing in or on the card, and may read the image on the card and extract a handler that may be used to determine an access right. Alternatively, the handler may be used to generate a display for the user. In some cases, the handler includes an access right. In other cases, the handler serves as a reference that may be used to determine an access right. For example, the handler may be exchanged with the media player to determine if a serial number in the handler relates to an optical disk being played.

The card store 740 includes one or more jackets configured to store cards for subsequent access. For example, when a card is not secured in the card reader 730, the card store 740 may be used to prevent the cards from being damaged. In one example, the card store 740 includes a jacket configured to store both an optical disk and the card. The jacket may prevent the optical disk and the card from being bent, scratched, or degraded through, for example, accidental exposure to particulates or liquid.

The card store 740 may include a logical device configured to track cards that are secured in the card store 740. For example, the card store 740 may include a probe configured to read a serial number from the card as the card is stored. The probe may be configured to read a static memory device embedded in the card. This static memory device may be used to verify that the card controls or remains in proximity with the electronic loose-leaf 700. For example, so long as the electronic loose-leaf 700 is able to verify that the card resides in card store 740, the electronic loose-leaf 700 may control the media player, even when the card does not reside in the card reader 730. The electronic loose-leaf 700 may accommodate the time required to transfer a card from a card reader 730 to the card store 740. For example, the electronic loose-leaf 700 may allow the user to take sixty seconds to transfer the card from the card reader 730 to the card store 740. This may allow the user to enjoy the art and information printed on the card (e.g., lyrics), which also may double as the repository of information read by the card reader 730.

Even though the card may use a band accessed by the card store 740, the information read by the card reader 730 need not reside in the same band as one used by a card store. Rather, the card store 740 illustrates how the card may be tracked even when the card does not reside in the card reader 730. Thus, the card could include an image read by the card reader 730 and logic read by the card store 740.

The processor 750 includes a logical controller configured to manage the cards and related access rights for content being accessed. The processor 750 also may be configured to act as a remote control for a media player. The processor 750 may include a specialized or general-purpose processor.

The processor 750 is configured to act as a controller for other devices in the electronic loose-leaf 700. For example, the processor 750 is configured to operate code segments that generate output on the display 710, receive inputs on the keypad 720, receive a handler on the card reader 730, and communicate data using the transceiver 760.

The transceiver 760 includes a wireless transmitter and/or a receiver configured to exchange wireless data with the media player. The transceiver 760 may operate using optical, infrared, or other wireless frequencies. Generally, the transceiver 760 receives one or more instructions that have been routed through the processor 760. For example, the transceiver may receive information generated by the card reader 730 that has been encapsulated by the processor 750 for transmission to the media player.

Although implementations of the electronic loose-leaf 700 have been described as a complex computing device with a display 710, a keypad 720, a card reader 730, a card store 740, a processor 750, and a transceiver 760, other implementations may include a simplified special purpose device configured to exchange card information with a media player. In one example, the constituent components described previously interface directly through interconnect logic to the transceiver 760 so that the media player may process and receive a user's inputs. In another example, the electronic loose-leaf 700 may not include all of the components described previously. One such electronic loose-leaf may include a remote control with several input buttons, a card reader, and a transceiver.

The electronic loose-leaf 700 is not limited to determining access rights. For example, electronic loose-leaf 700 may use the card to present media-specific information in the display.

Figure 8:
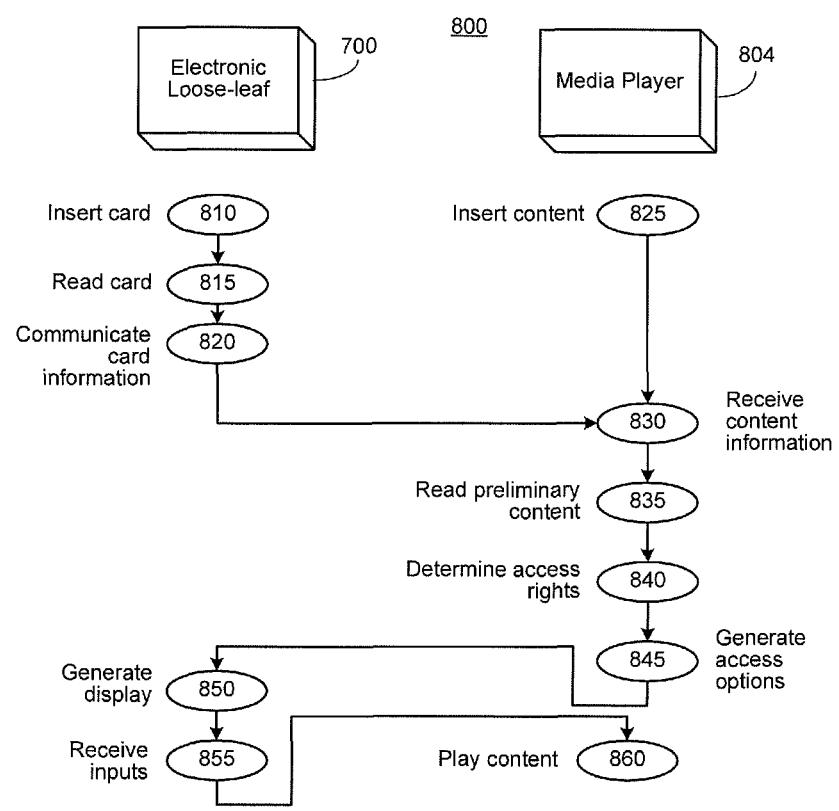
FIG. 8 is a flow chart of a process in which an electronic loose-leaf interfaces with a media player.

Referring to FIG. 8, a process 800 illustrates how the electronic loose-leaf 700 may interface with a media player 804. In general, the media player 804 corresponds to the media player described previously with respect to FIGS. 1-6.

Initially, a consumer inserts a card in the electronic loose-leaf (810). Inserting a card may include removing a card from storage (e.g., card store 740) and placing the card in the reader 730. The electronic loose-leaf 700 reads the card (815). Reading the card may include using an optical sensor in the card reader 730 and determining optical values located at certain portions of the card. Reading the card generates a handler, or snapshot of information on the card. In some implementations, the handler includes the access rights for the content being accessed. However, in other examples, the handler may be used to generate a display on the display 710 of the electronic loose-leaf 700.

As the consumer is inserting the card into the electronic loose-leaf 700, the consumer also may insert content into the media player 804 (825). In one instance, the content is inserted before the card is read. Alternatively, the content may be inserted after the card is read.

In any event, after the card is read and the handler is determined, the electronic loose-leaf 700 communicates the card information to the media player 804 (820). The media player receives the content information (830).

When the electronic loose-leaf 700 is used to determine access rights, the electronic loose-leaf 700 may be used to administer an access control system. When the electronic loose-leaf 700 is communicating other information, the information may be used to control use of the content. For example, a particular track on a particular album may be requested.

The media player 804 then reads preliminary content (835). The media player 804 may read preliminary content to verify that the instructions received correlate to the optical disk in the media player. The media player then determines whether the access rights that were read from the card are authorized to access the media (840). For example, the serial number associated with the card may not match the serial number associated with the album. In response, the media player 804 may act to limit access options.

The card may include promotional material that has been printed in a magazine. The promotional material may include access rights for a limited number of reads. Determining the access rights may include determining that the consumer has exhausted the promotional access rights.

The media player 804 generates one or more access options (845). The access rights to the content may be limited. For example, if the electronic loose-leaf 700 and/or the media player 804 determines that the access request conforms to a pirated profile, access to the content may be denied. Alternatively, the media player may be allowed to play but not copy the content.

Generating the access options may include presenting the user with the ability to purchase additional access rights. For example, the media player 804 may work with the electronic loose-leaf to generate a display descriptive of additional opportunities (850). When the user exhausts a license for three copies after having copied the content to a home theater system, a car audio system, and a mobile stereo system, the display may generate an e-commerce ticket enabling the user to secure an additional copy/license for another device, such as, for example, a personal computer, a boat, or a second home.

The electronic loose-leaf 700 may execute the transaction. For example, if the user is associated with a particular billing method, the electronic loose-leaf may generate the communications that appropriately debit the user's account and upload the content and/or license. The billing method need not include a direct cost approach (i.e., the billing method need not charge the user for the license). Billing methods may include indirect licensing techniques, such as a enabling the user to license and/or download a specified number of items per month.

In any event, regardless of whether the user is selecting content to access or engaging in a licensing/download transaction, the electronic loose-leaf receives the user's inputs (855). For instance, when the user elects to play track 7 on CD Y, the electronic loose-leaf transmits the user's inputs to the media player 804. The media player then plays the content (860).

The media player need not receive removable media such as an optical disk. If the media player 804 acts as a repository of multiple selections of content, the electronic loose-leaf may act as a gateway to the repository. For instance, access to the stored content may be regulated by relating access to the stored content to a card in the electronic loose-leaf 700. Accordingly, the user need not acquire the content selection itself. For instance, a user may visit a retail outlet to purchase a card used to unlock content stored on or downloadable to a media player. The retail outlet may manage access to cards (e.g., inventory) and relate the cards to a user identity or profile. For example, the retail outlet may provide a user with a promotional card based on the user's online profile.

Figure 9:
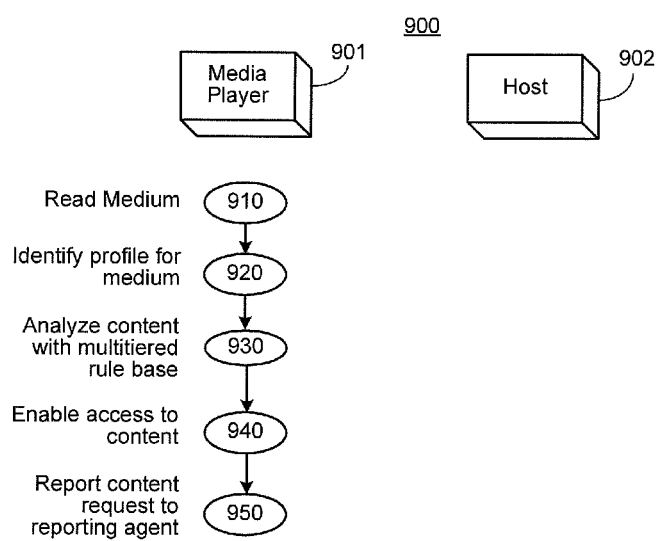
FIG. 9 is a flow chart of an exemplary process by which a media player may regulate access to content using a multitiered rule base.

Referring to FIG. 9, a flow chart 900 illustrates an exemplary process by which a media player 901 may regulate access to content using a multitiered rule base. For convenience, particular components described earlier are referenced as performing the process. However, similar methodologies may be applied in other implementations where different components are used to define the structure of the system, or where the functionality is distributed differently among the components shown. Furthermore, although flow chart 900 is shown as a sequence of operations, the operations in flow chart 900 may be performed in a different or parallel order. Alternatively, the operations shown in flow chart 900 may be performed in a distributed manner on multiple systems (e.g., on a media player that accesses a host).

Initially, the media player 901 reads the medium (910). Reading the medium may include reading an optical disk inserted into an optical disk player and may also include performing one or more operations on the media player 901. In one example, an out-of-band token related to the optical disk may be read before the optical disk is inserted into the media player 901. In another example, a track or portion of content may be designated for display or output.

A profile is identified for the medium (920). Generally, the profile is identified so that the content request (e.g., the operation that the user wants to perform) may be analyzed and authenticated. Identifying a profile for the medium may include identifying a serial number for an optical disk that has been inserted, and/or identifying an artist, album, track, or content identification information. Identifying a profile also may include reading an out-of-band token that describes the content being referenced.

The profile for the medium does not need to be unique. For example, the profile may only describe the content that the user is accessing, rather than a particular serial number or instance of the medium that the user is accessing.

The profile is used to analyze a content request with a multitiered rule base (930). Analyzing the content request with the multitiered rule base enables the media player 901 to use two or more of a medium rule base, a media player rule base, and a host rule base in deciding whether to enable a media player 901 to support the content request. Typically, a medium rule base relates to a set of content access rules that are stored with the medium. For example, if the medium includes promotional content (e.g., content sponsored by an advertiser), the medium rule base may store information regulating access to the promotional content so that the content may be accessed only a certain number of times during a certain promotional period.

The media player rule base may include a set of rules that are associated with or stored on the media player. The media player rule base may receive a content request and analyze the request against a stored set of permissions. The media player rule base may provide selective access to the media player. For example, the media player rule base may manage licenses for content that is purchased for installation on a particular media player.

The media player rule base also may relate to a particular user identity. For example, a user may be participating in a purchasing program where the content is distributed and accessible by a particular user. When other users attempt to access the content, the access rights may be reduced or eliminated. Thus, when using the multitiered rule base to analyze the content request, the media player 901 may identify the user. The user may be identified by enabling input of a user profile (e.g., by using an out-of-band token), or by associating the media player 901 with a particular identity (e.g., by analyzing the user's phone number or network information that is used when accessing a host).

The host rule base also may be used in analyzing the content request. A media player 901 with a communications interface may exchange information with a host 902 to analyze the content request. In one example, the host 902 receives information from the media player 901 to evaluate the transaction. The host 902 then may decide whether to allow the media player 901 to engage in the content request. In another example, the host 902 may provide information to the media player 901 so that the media player 901 may decide whether to allow the content request.

The host 902 also may provide encryption parameters that enable the media player 901 to decrypt or otherwise operate on the content. In one example, the content may be encrypted until the content request is validated on a host 902 that acts as a clearinghouse for license administration. In another example, when a media player 901 attempts to copy the content, the content may be encrypted so that it may only be decrypted by a particular device or a device associated with a particular user identity.

When analysis indicates that the content access transaction may be supported, access to the content is enabled (940). Enabling access to the content may include enabling a user to play, display, exchange, and/or copy the content.

As an optional operation, the content request may be reported to a reporting agent (950). Reporting the content request to a reporting agent may include aggregating multiple content requests on the media player, and sending updates describing multiple content requests to the host.

Figure 10:
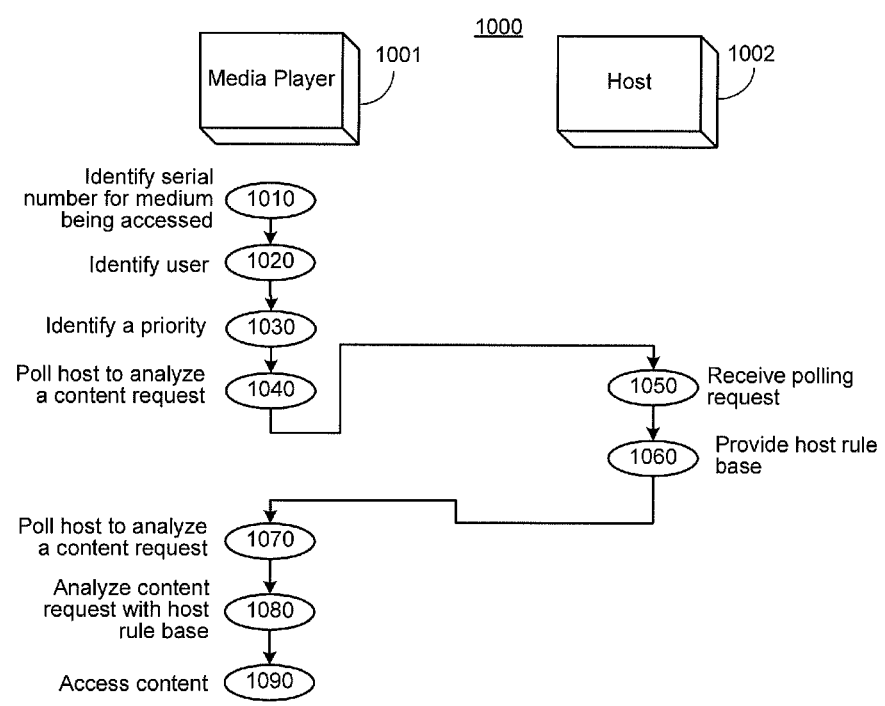
FIG. 10 is a flow chart of an exemplary process by in which a media player may poll a host to enable user access to content.

Referring to FIG. 10, a flow chart 1000 illustrates an exemplary process by which a media player 1001 may poll a host 1002 to enable user access to content. For convenience, particular components described earlier are referenced as performing the process. However, similar methodologies may be applied in other implementations where different components are used to define the structure of the system, or where the functionality is distributed differently among the components shown. FIG. 10 illustrates how a media player 1001 may initially access a host rule base before accessing other rule bases in the multitiered rule base.

In flow chart 1000, it is presumed that the medium has been read, for example, in an operation similar to operation 910 in FIG. 9. The media player 1001 identifies a profile that includes a serial number for the medium being accessed (1010), and also identifies a user (1020). Identifying a user need not include identifying a first name and last name for the user. Rather, identifying the user may include recognizing that a user that has previously used the media player is using the media player again. The user may be identified by using a screen name, user id, biometric identifier, token or identifying object.

The media player 1001 identifies a priority (1030). Identifying the priority for the multitiered rule base may include determining an order in which the different rule bases (e.g., the medium rule base, the media player rule base, and the host rule base) are accessed. For example, the priority may include using the host rule base first, then using the media player rule base, and finally using a medium rule base when the other rule bases are unavailable. Other examples of determining a priority may include using one or more rule bases together or simultaneously accessing multiple rule bases. Thus, a media player may use information from a host rule base in conjunction with information from the medium rule base.

In flow chart 1000, determining the priority includes initially analyzing the content request with the host rule base. Accordingly, the media player 1001 polls the host 1002 to analyze the content request (1040). The host 1002 receives the polling request (1050) and provides a host rule base (1060). In one example, providing a host rule base includes receiving a request to authenticate a content request and indicating whether the media player is allowed to access the content. In another example, providing a host rule base includes receiving parameters descriptive of the content request and providing a host rule base so that the media player 1001 may analyze the transaction. In any event, regardless of the information provided by the host 1002, the host 1002 provides a host rule base to the media player 1001, which, in turn, receives the host rule base (1060 and 1070). The client then may analyze the content request with the host rule base (1080). When the host rule base supports access to the content, the media player 1001 is allowed to access the content (1090).

Figure 11:
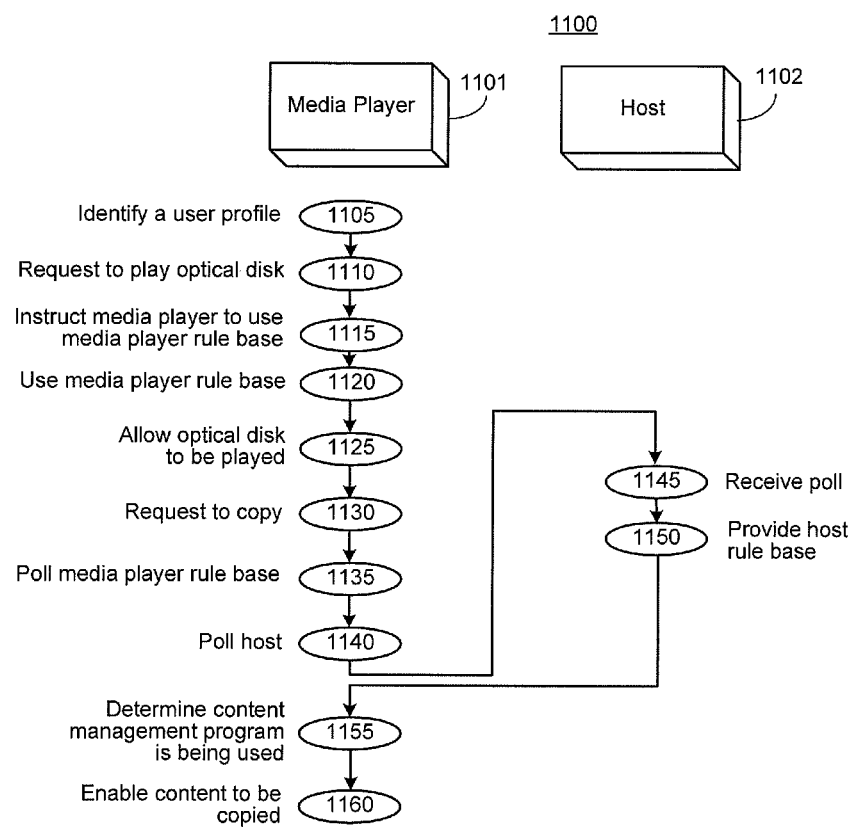
FIG. 11 is a flow chart of an exemplary process by which a media player uses multiple tiers of the multitiered rule base in a sequence of content requests.

Referring to FIG. 11, flow chart 1100 illustrates an exemplary process by which a media player 1101 uses multiple tiers of the multitiered rule base in a sequence of content requests. For convenience, particular components described earlier are referenced as performing the process. However, similar methodologies may be applied in other implementations where different components are used to define the structure of the system, or where the functionality is distributed differently among the components shown.

Initially, the media player 1101 identifies a user profile (1105). Identifying the user profile may include reading a card or out-of-band token to identify the operator of the media player 1101. The user requests to play an optical disc that has been loaded in the media player 1101 (1110). The media player 1101 initially uses a media player rule base that instructs the media player 1101 to use the medium rule base associated with the content that is accessed (1115). The media player 1101 then uses the medium rule base to analyze the request to play the content (1120), and, upon determining the request is permitted, allows the user to access the content (1125) so that the optical disk may be played.

When the user later tries to copy a content selection (1130), the media player polls the media player rule base to determine if the media player may copy the content (1135). The media player 1101 uses the media player rule base to receive instructions. In this case, the media player 1101 is instructed to access a host 1102 and analyze the request to copy the content selection using the host rule base.

The media player 1101 then polls the host 1102 (1140), which receives the request to copy the content selection (1145). The host rule base indicates that the content selection may be copied if the medium has been configured to participate in a content management program. The host 1102 provides the host rule base to the media player to analyze the content request with the media player 1101 (1150). The media player 1101 reads the medium and determines that the medium is participating in a content management program (1155). The media player enables the content to be copied (1160).

In one implementation, enabling the content to be copied includes decrypting the content on the medium using a key received from the host. As the content is copied, it may be encrypted again using a different key. By changing the keys used to encrypt the content and regulating access to the keys using a host, access to the content may be regulated.

The media player 1101 then may report to the host 1102 that the content has been copied (not shown). The media player 1101 may aggregate multiple transactions and report multiple transactions to the host 1102 on a periodic basis. For example, the media player 1101 may send one update to the host every time that a specified number of transactions occur. In another example, the media player 1101 may exchange transaction information every month.

In one example of how a media player may interface with one particular implementation of a multitiered rule base that participates in a license management system, the multitiered rule base includes a medium rule base residing on an optical disk, a media player rule base residing on a media player, and a host rule base residing on a host. The media player includes a controller configured to interface with the multitiered rule base. The controller accesses a medium rule base residing on an optical disk through an optical disk reader, accesses a media player rule base stored on a memory device in the media player, and uses a communications interface to access a host rule base on a host. In this example, the controller decides which rule base to use based on the type of operation in the content request and defined parameters (which may be referred to as parameters of the multitiered rule base) about how different types of content requests are to be processed. For those operations involving less risk of improper use (e.g., less likelihood of piracy), the medium rule base is used. In one implementation, the medium rule base allows the optical disk to be played a limited number of times. For those operations involving a greater risk of improper use, the media player rule base is used. In this example, these operations include content requests to copy a content selection from an optical disk onto a hard drive residing in a media player and supporting an unlimited number of "play" content requests for content selections stored on the hard drive or on an optical disk. For those operations involving the greatest degree of risk, the host rule base is used. In this example, a content request to copy a content selection from a hard drive onto an optical disk uses the host rule base to analyze the content request.

In this example, it is assumed that a user has received promotional content residing on an optical disk and wishes to transfer a content selection from the optical disk onto a hard drive in the media player. The user then wishes to copy the content selection from the hard drive in the media player to an optical disk.

The user initially receives an optical disk with a content selection in a mail promotion. The user inserts the optical disk into the media player and presses a "play" button to generate a content request to play the content selection. The media player receives the content request and determines that the medium rule base should be used to play the content selection. The media player reads a medium rule base from the optical disk. The medium rule base indicates that the content selection may be played three times and none of the "play" rights have been used. The media player then decrements a counter associated with the "play" rights, and plays the content selection.

The user enjoys the content selection and wishes to add the promotional content to a hard drive in the media player. The user generates the content request by pressing a "copy from optical disk to hard drive" button on the media player. Since copying content from an optical disk to a hard drive has been categorized as a higher risk operation, the media player uses the media player rule base to analyze the content request. In this example, the media player rule base requires the media player to participate in a licensing system in order to perform a "copy from optical disk to hard drive" operation. In this example, the user has purchased two general licenses to copy promotional material onto a hard drive, the purchased promotional rights were placed in an escrow account, and the escrow rights then were downloaded to the media player so that the media player need not poll a host to perform optical disk to hard drive copy operations. Note that the purchased promotional rights did not identify the particular content that was licensed. Rather, two operations in the identified class of operations were enabled. Since the media player has the access rights in the license pool required by the media player rule base to perform the "copy from optical disk to hard drive" operation, the media player copies the promotional material to the hard drive.

After enjoying the content selection on the hard drive in the media player, the user desires to enjoy the content selection for use in a car stereo system and generates a content request to copy an instance from the hard drive of the media player to an optical disk (presuming the access rights in the promotional optical disk are inadequate or unavailable to the user). The user presses a "copy from hard drive to optical disk" button to copy the content selection from the hard drive in the media player to a writeable optical disk. The media player receives the content request and determines that a host rule base should be used to analyze the content request. The media player uses a communications interface to interface with a host to use a host rule base in analyzing the content request. In this case, the media player indicates that the content request includes a "copy from hard drive to optical disk" operation. Analyzing the content request with a host rule base indicates that the user must purchase a license to perform the requested operation since the required license is unavailable in the appropriate user account. As a result, the user is charged for the requested operation. In this instance, a credit card associated with the user account is debited. Purchasing the required license allows the operation requested in the content request to be performed, and the media player copies the content selection to an optical disk.

A number of variations on the previously described example may be performed. For example, the user may be prompted to present an out-of-band token with user identification information to interface with the host and execute the credit card transaction. In another example, the media player need not select the rule base based on the class of operations in the content request. Instead, the media player may start with one rule base (e.g., the medium rule base) and automatically discover additional access rights as required if a user attempts to engage in a content request for an operation not previously allowed in the present rule base.

Other implementations are within the scope of the following claims. For example, the electronic loose-leaf and the media player may distribute the operations across one or more systems and/or proxies. In another example, the content may be accessed on a first device, while the out-of-band token is accessed on another device. A media player that reads an optical disk may be used to read the content while an optical sensor attached to a personal computer may access the out-of-band token. The content then may interface with the out-of-band token sensor to determine the access rights for the content.

Although the electronic loose-leaf is described as interfacing with a card, the electronic loose-leaf may interface with other structures. For example, three-dimensional tokens, including cylindrical, ornamental, and/or matchbox structures may be used.

The media player may set time constraints on the content that is accessed. When the media player is unable to exchange information with the host, the media player may enable access to the content for a limited duration until the media player can communicate with the host. Thus, a user may be allowed to copy a content selection, but the duplicated content selection may expire after a period of time if the media player is unable to communicate with the host at the expiration of the period of time.

What is claimed is:

1. A method of regulating access to a content selection, the method comprising:
   receiving by a computer, a request to access a content selection;
   configuring by the computer, a media player to access a medium associated with the content selection;
   accessing by the computer the medium associated with the content selection;
   reading by the computer and using an out-of-band sensor an image with reference information encoded in machine readable format, the reference information including a token identifier;
   determining by the computer a state of network connectivity for a media player;
   accessing and applying by the computer, based on the determined state of network connectivity for the media player and the read reference information a rule base from across a domain, wherein the domain includes a set of rule bases where one or more of the rule bases in the set of rule bases is inaccessible as indicated by the state of network connectivity, the set of rules bases including at least:
      a medium rule base stored with the medium, the medium rule base including a set of access rules related to content permissions associated with the medium;
      a media player rule base stored on the media player, the media player rule base including a set of access rules related to content permissions associated with the media player; and
      a host rule base stored on the host, the host rule base including a set of access rules related to content permission associated with the host, the host being remote from the media player;
   analyzing by the computer, the request by:
      determining that (i) the host rule base stored on the host is inaccessible and (ii) one or more of the medium rule base stored with the medium and the media player rule base is stored on the media player is accessible;
      in response to determining that (i) the host rule base stored on the host is inaccessible and (ii) one or more of the medium rule base is stored with the medium and the media player rule base stored on the media player is accessible, accessing by the computer at least one accessible rule base; and
      determining by the computer and based on the token identifier, at least one result associated with access rights to the content selection from the at least one accessed rule base; and
   accessing by the computer, the content selection in accordance with the at least one result of the analysis.

2. The method of claim 1 further comprising identifying a profile associated with the medium, wherein identifying the profile includes identifying a reference for the medium.

3. The method of claim 2 wherein identifying the reference includes identifying a unique serial number.

4. The method of claim 1 further comprising identifying a user accessing the content selection.

5. The method of claim 4 further comprising:
   identifying content identified by a profile; and
   determining an access right for the user for the content identified by the profile.

6. The method of claim 1 further comprising reporting the request to access the content selection to a reporting agent.

7. The method of claim 6 wherein reporting the request to access the content selection includes aggregating multiple requests to access content selections associated with the media player and reporting the aggregated multiple requests to access the content selections to the host.

8. The method of claim 1 wherein analyzing the request by accessing the accessed rule base includes automatically discovering additional access rights by polling any of the rule bases upon determination that a user attempts to engage in a request to access the content selection for an operation not previously allowed in accordance with the access right.

9. The method of claim 8 further comprising enabling the user to engage in the request to access the content selection by charging the request to access the content selection against a user account.

10. The method of claim 9 wherein charging the request against the user account includes adjusting a license pool that enables the user to engage in at least one licensing operation.

11. The method of claim 10 wherein adjusting the license pool includes adjusting an escrow account for previously purchased access rights that do not specifically identify the content selection.

12. The method of claim 9 wherein charging the request against the user account includes using an out-of-band token to identify the account, and charging the request to access the content selection against the user account in response to using the out-of-band token.

13. The method of claim 1 wherein determining the at least one result associated with access rights to the content selection from the at least one accessed rule base comprises:
   determining the at least one result using, in order of priority and based on accessibility, the host rule base, the media player rule base, and the medium rule base.

14. The method of claim 1 wherein analyzing the request includes determining an access right without challenging a user.

15. The method of claim 1 further comprising reading the medium with an out-of-band token related to the medium.

16. The method of claim 1 wherein analyzing the request includes:
   enabling a user to copy content in response to determining to make the determination of at least one result from the host rule base stored on the host.

17. The method of claim 1 wherein analyzing the request includes:
   enabling a user to copy content in response to determining to make the determination of at least one result from a content-access system rule base and based on a media player storing the media player rule base exchanging licensing information with a host.

18. A system comprising:
a non-transitory computer readable medium;
a processor;
the non-transitory computer readable medium storing executable instructions that when executed by the processor, causes the processor to perform the functions of:
receiving a request to access a content selection;
configuring a media player to access a medium associated with the content selection;
accessing the medium associated with the content selection;
reading and using an out-of-band sensor, an image with reference information encoded in machine readable format, the reference information including a token identifier;
determining a state of network connectivity for a media player;
accessing and applying based on the determined state of network connectivity for the media player and the read reference information a rule base from across a domain, wherein the domain includes a set of rule bases where one or more of the rule bases in the set of rule bases is inaccessible as indicated by the state of network connectivity, the set of rules bases including at least:
  a medium rule base stored with the medium, the medium rule base including a set of access rules related to content permissions associated with the medium;
  a media player rule base stored on the media player, the media player rule base including a set of access rules related to content permissions associated with the media player; and
  a host rule base stored on the host, the host rule base including a set of access rules related to content permission associated with the host, the host being remote from the media player;
analyzing the request by: determining that (i) the host rule base stored on the host is inaccessible and (ii) one or more of the medium rule base stored with the medium and the media player rule base stored on the media player is accessible; in response to determining that (i) the host rule base stored on the host is inaccessible and (ii) one or more of the medium rule base stored with the medium and the media player rule base stored on the media player is accessible, accessing by the computer at least one accessible rule base; and
determining based on the token identifier, at least one result associated with access rights to the content selection from the at least one accessed rule base; and
accessing the content selection in accordance with the at least one result of the analysis.

19. The system of claim 18 wherein the operations further comprise:
identifying a profile associated with the medium, wherein identifying the profile includes identifying a reference for the medium.

20. A non-transitory computer-readable medium storing software comprising instructions executable by one or more computers which, upon such execution, cause the one or more computers to perform operations comprising:
receiving a request to access a content selection;
configuring a media player to access a medium associated with the content selection;
accessing the medium associated with the content selection;
reading and using an out-of-band sensor, an image with reference information encoded in machine readable format, the reference information including a token identifier;
determining a state of network connectivity for a media player;
accessing and applying based on the determined state of network connectivity for the media player and the read reference information a rule base from across a domain, wherein the domain includes a set of rule bases where one or more of the rule bases in the set of rule bases is inaccessible as indicated by the state of network connectivity, the set of rules bases including at least:
  a medium rule base stored with the medium, the medium rule base including a set of access rules related to content permissions associated with the medium;
  a media player rule base stored on the media player, the media player rule base including a set of access rules related to content permissions associated with the media player; and
  a host rule base stored on the host, the host rule base including a set of access rules related to content permission associated with the host, the host being remote from the media player;
analyzing the request by: determining that (i) the host rule base stored on the host is inaccessible and (ii) one or more of the medium rule base stored with the medium and the media player rule base stored on the media player is accessible; in response to determining that (i) the host rule base stored on the host is inaccessible and (ii) one or more of the medium rule base stored with the medium and the media player rule base stored on the media player is accessible, accessing by the computer at least one accessible rule base; and
determining based on the token identifier, at least one result associated with access rights to the content selection from the at least one accessed rule base; and
accessing the content selection in accordance with the at least one result of the analysis.

* * * * *